(12) United States Patent
Tamm (10) Patent No.: US 9,761,960 B2
(45) Date of Patent: Sep. 12, 2017

(54) ELECTRICAL TRANSMISSION LINE REPAIR APPARATUS

(71) Applicant: Classic Connectors, Trussville, AL (US)

(72) Inventor: Carl Russel Tamm, Trussville, AL (US)

(73) Assignee: Classic Connectors, Trussville, AL (US)

( * ) Notice: Subject to any disclaimer, the term of this patent is extended or adjusted under 35 U.S.C. 154(b) by 228 days.

(21) Appl. No.: 14/620,151

(22) Filed: Feb. 11, 2015

(65) Prior Publication Data

US 2015/0255888 A1 Sep. 10, 2015

Related U.S. Application Data

(60) Provisional application No. 61/938,194, filed on Feb. 11, 2014.

(51) Int. Cl.
| | |
|---|---|
| *H01R 4/38* | (2006.01) |
| *H01R 4/44* | (2006.01) |
| *H01R 43/00* | (2006.01) |
| *H02G 1/02* | (2006.01) |
| *H01R 4/46* | (2006.01) |

(52) U.S. Cl.
CPC ............. *H01R 4/44* (2013.01); *H01R 4/46* (2013.01); *H01R 43/00* (2013.01); *H02G 1/02* (2013.01); *Y10T 29/532* (2015.01)

(58) Field of Classification Search
CPC .. H01R 4/44; H01R 4/62; H01R 43/00; Y10T 29/49194
See application file for complete search history.

(56) References Cited

U.S. PATENT DOCUMENTS 3,287,491 A * 11/1966 Hubbard ................. H01R 4/40
174/138 R
4,661,662 A *  4/1987 Finke ...................... H01H 31/00
200/48 R (Continued)

FOREIGN PATENT DOCUMENTS

CA              2939560    *  8/2015
CN         201466576 U     12/2010

(Continued)

*Primary Examiner* — Minh Trinh
(74) *Attorney, Agent, or Firm* — The Watson I.P. Group, PLC; Jovan N. Jovanovic; Vladan M. Vasiljevic (57) ABSTRACT

An electrical transmission line repair apparatus comprising a first end section, a second end section and a link member. The first and second end sections are spaced apart from each other and each configured to receive and releasably retain a conductor thereacross. The link member is positioned on one side of the first and second end sections, so that the first and second end sections can be coupled to a conductor on either side of a link member, suspension or other device from below, and without decoupling or de-energizing the transmission line. In addition, the installation of the same and the clamping can be achieved from below the conductor upon positioning. That is, the link member or members do not straddle the transmission line, requiring dismantling of the dead end configuration, or the disassembly of the link member from the first and second end section.

13 Claims, 11 Drawing Sheets

(56) References Cited

U.S. PATENT DOCUMENTS

| | | | |
|---|---|---|---|
| 4,795,365 A | 1/1989 | Johnston et al. | |
| 7,794,291 B2 | 9/2010 | Goch | |
| 2015/0255888 A1* | 9/2015 | Tamm | H01R 43/00 |
| | | | 29/745 |
| 2016/0104954 A1* | 4/2016 | Wolf | H02G 1/02 |
| | | | 439/797 |

FOREIGN PATENT DOCUMENTS

| | | |
|---|---|---|
| KR | 20080024845 A | 3/2008 |
| WO | 2009042526 A1 | 4/2009 |

\* cited by examiner

Figure 22

ELECTRICAL TRANSMISSION LINE REPAIR APPARATUS

CROSS-REFERENCE TO RELATED APPLICATION

This application claims priority from U.S. Provisional Patent Application Ser. No. 61/938,194 filed Feb. 11, 2014, entitled "Electrical Transmission Line Repair Apparatus," the entire specification of which is hereby incorporated by reference in its entirety.

BACKGROUND OF THE DISCLOSURE

1. Field of the Disclosure

The disclosure relates in general to electrical transmission line repair systems, and more particularly, to an electrical transmission line repair apparatus that is configured to provide mechanical and/or electrical integrity to electrical conductors as well as connectors, clamps, suspensions and the like. It will be understood that while transmission line is referred to herein, such shall encompass many types of electrical lines, including those that are often referred to as distribution lines and the like.

2. Background Art

Electrical transmission lines are well known in the art and include commonly known overhead types. Such types of electrical transmission lines comprise a core formed from metal members, as well as composite members having an outer conductive cladding extending around the core, typically made from an aluminum or aluminum alloy (although other conductors are likewise contemplated). A number of different configurations of such transmission lines as well as connectors, suspensions and clamps are disclosed in U.S. Pat. No. 7,794,291 issued to Goch, entitled "Electrical Transmission Line Repair Service," the entire specification of which is hereby incorporated by reference.

While the solutions proposed in the prior art have greatly facilitated the restoration of mechanical and/or electrical integrity to such systems, there is a constant need for improvement. One area of improvement pertains to preparation and installation on a jobsite. As will be appreciated, the installation of these devices is often done on energized lines that are suspended above the ground, often at great heights. Thus, the installation environment is quite rugged and difficult. Thus, there is a persistent need to allow for easier preparation of the devices and the adjoining lines, as well as easier assembly. It is advantageous to be in a position to couple and install such a device from below the transmission line, and so as to have access to all the necessary portions of the device from below. This is especially difficult with existing equipment in a dead end configuration due to the necessity to straddle the transmission line on either side thereof. In addition, there is a need to minimize the componentry so as to limit both the weight and the structure of the device that must be handled by users in such rugged environments.

SUMMARY OF THE DISCLOSURE

The disclosure is directed to an electrical transmission line repair apparatus comprising a first end section, a second end section, and at least one link member. The first end section includes a body and at least one clamping member. The body includes a conductor receiving groove positioned on an inner side of the body extending transversely thereacross from an inner end to an outer end. The at least one clamping member includes an inner surface and an outer surface, as well as, an inner side and an outer side. A conductor receiving groove extends between a first end and a second end of the clamping member, between the inner side and the outer side.

The body and the at least one clamping member are releasably attachable to each other through a plurality of fasteners. In such a configuration, the inner surface of the at least one clamping member faces the inner side of the body, with the conductor receiving groove of the body substantially matching with the conductor receiving groove of the at least one clamping member, so as to be configured to clamp a conductor therebetween. At least one of the plurality of fasteners is positioned between the inboard side and the conductor receiving groove. The other of the plurality of fasteners is positioned between the outboard side and the conductor receiving groove.

A second end section is spaced apart from the first end section. The second end section further includes a body and at least one clamping member. The body includes a conductor receiving groove positioned on an inner side of the body extending transversely thereacross from an inner end to an outer end. The at least one clamping member includes an inner surface and an outer surface, as well as, an inner side and an outer side. A conductor receiving groove extending between a first end and a second end of the clamping member, between the inner side and the outer side thereof.

The body and the at least one clamping member are releasably attachable to each other through a plurality of fasteners. In such a configuration, the inner surface of the at least one clamping member faces the inner side of the body, with the conductor receiving groove of the body substantially matching with the conductor receiving groove of the at least one clamping member, so as to be configured to clamp a conductor therebetween. At least one of the plurality of fasteners is positioned between the inboard side and the conductor receiving groove. The other of the plurality of fasteners is positioned between the outboard side and the conductor receiving groove.

The at least one link member joining the first end section to the second end section. Each of the at least one link member coupled to the first end section at or between the conductor receiving groove and the inboard side thereof.

In some configurations, the body of the first end section and the body of the second end section are substantial mirror images of each other.

In some configurations, the at least one link member comprises a single link member that extends between the first end section and the second end section. The at least one link member is oriented substantially parallel to the conductor receiving groove of each of the first end section and the second end section at the respective one of the first end section and the second end section. The link member substantially corresponds to the configuration of a transmission line with which the apparatus is to be utilized In some configurations, the single link member is coupled to the first end section at the inner end thereof. The single link member is coupled to the second end section at the inner end thereof.

In some configurations, the at least one fastener that is positioned between the conductor receiving groove and the inboard side of each of the first end section and the second end section comprises at least two spaced apart bolts extending through the at least one clamping members. Such a configuration precludes rotation of the at least one clamping members about an axis defined by the at least two spaced apart bolts.

In some configurations, the at least one fastener that is positioned between the conductor receiving groove and the outboard side of each of the first end section and the second end section comprises a bolt configured to extend through an opening on the clamping member. Such bolt is engageable with a corresponding threaded member on the body between the conductor receiving groove and the outboard side.

In some such configurations, at least one biasing member extends between the at least one clamping member and the respective one of the first and second end section with which the at least one clamping member is associated. The at least one biasing member is configured to bias the clamping member away from the body.

In some configurations, the at least one fastener that is positioned between the conductor receiving groove and the outboard side of each of the first end section and the second end section comprises at least one pivot bolt that extends on the outboard side of the conductor receiving groove. The pivot bolt has a first end with an axle extending therethrough, the axle being rotatably coupled to the body at the outboard side thereof. The pivot bolt is rotatable relative to the body about the axle so as to be insertable into a slotted opening on the clamping member at the outer side thereof, so as to releasably couple the same.

In some configurations, the at least one clamping member of the first end section comprises a plurality of clamping members that are positioned sequentially between the inner end and the outer end of the body of the first end section. Similarly, the at least one clamping member of the second end section comprise a plurality of clamping members that are positioned sequentially between the inner end and the outer end of the body of the second end section.

In some configurations, each of the plurality of fasteners associated with the at least one clamping members of each of the first end section and second end section are oriented so as to be accessed from the inside surface of each of the first end section and the second end section.

In some configurations, each of the plurality of fasteners extend generally perpendicular to the conductor receiving groove of the respective one of the first and second end sections with which they are associated.

In some configurations, the first end section further includes a link member receiver positioned along the inboard side thereof. The link member receiver comprising a transverse bore that is substantially parallel to the conductor receiving groove of the first end section. The second end section further includes a link member receiver positioned along the inboard side thereof. The link member receiver comprising a transverse bore that is substantially parallel to the conductor receiving groove of the first end section.

In some configurations, the apparatus further includes a tether assembly including a tether cable with having a first end and a second end, and a bracket positioned at a first end and coupled to the first end section, the bracket further includes an elongated opening configured to receive a first end of the cable tether therethrough. The first end of the tether cable has a threadform therealong with a distal end. A nut is configured to engage the threadform, to, in turn, preclude removal of the tether cable from the bracket.

In some configurations, the distal end of the threadform of the tether cable is free of a threadform and having a diameter which is less than that of the threadform. The distal end terminates with an outwardly convex configuration.

BRIEF DESCRIPTION OF THE DRAWINGS

The disclosure will now be described with reference to the drawings wherein.

DETAILED DESCRIPTION OF THE DISCLOSURE

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1:
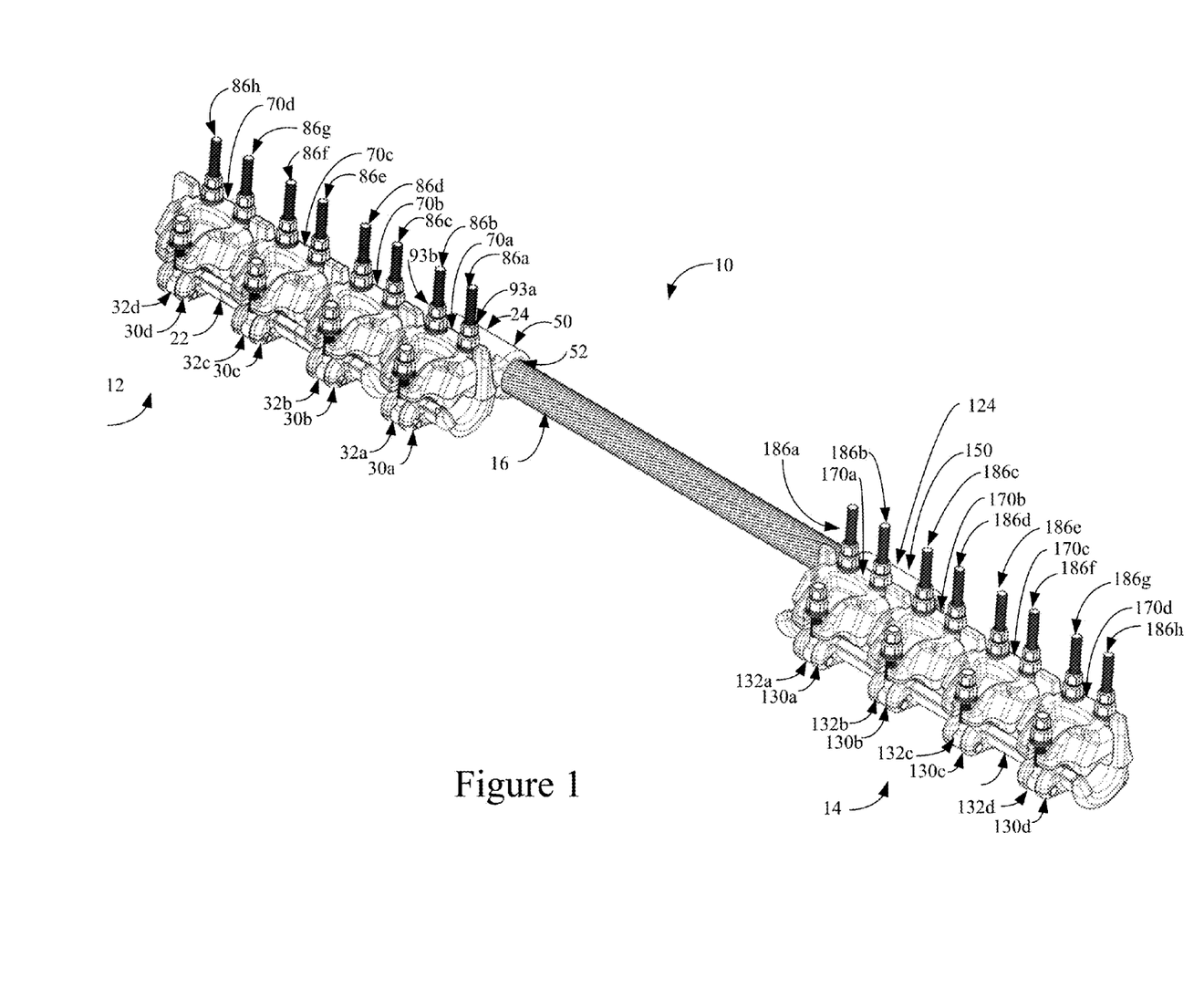
FIG. 1 of the drawings is a perspective view of an embodiment of the electrical transmission line repair apparatus of the present disclosure.
Figure 2:
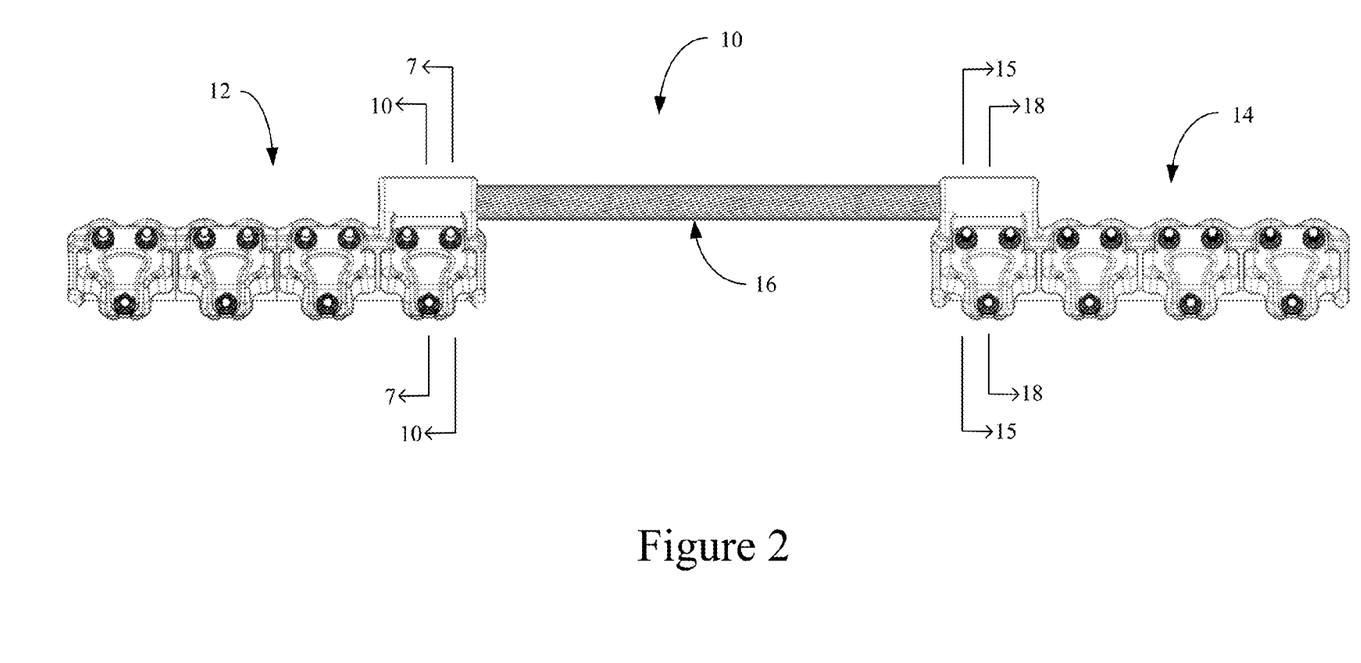
FIG. 2 of the drawings is a top plan view of the electrical transmission line repair apparatus of the present disclosure.

Referring now to the drawings and in particular to FIGS. 1 and 2, the electrical transmission line repair apparatus 10 is shown as including first end section 12, second end section 14 (FIG. 2 only) and link member 16. The apparatus 10 is configured for use in association with existing electrical transmission lines (see, i.e., FIG. 19), and in particular, provides advancements relative to coupling to an electrical transmission line. In particular, such an apparatus can be positioned and coupled from below between all types of connectors, dead ends, without any disassembly or decoupling of the same. Any coupling devices or link members which are coupled prior to installation between the first end section and second end section are positioned on one side of the conductor receiving groove such that the device can be inserted from a side position and positioned regardless of the type of structures that lie between the first end section and second end section. That is, straddling the transmission line is not required. Often, such a straddling is not possible (in the situation of a dead end, for example, while permitting installation from below the device and while permitting coupling without separating or disassembling a structure therebetween.

The first end section 12 is shown in FIGS. 1 and 3 through 5, collectively, as comprising body 22, pivot bolts 32a-32d, clamping members 70a-70d and coupling bolts 86a-86h. The body 22 is defined by inner end 40, outer end 41, inboard side 42, outboard side 43, inner side 44 and outer side 45. It will be understood that the body 22 generally comprises a cast or forged metal member (preferably a steel, aluminum alloy or other conductive material).

Figure 7:
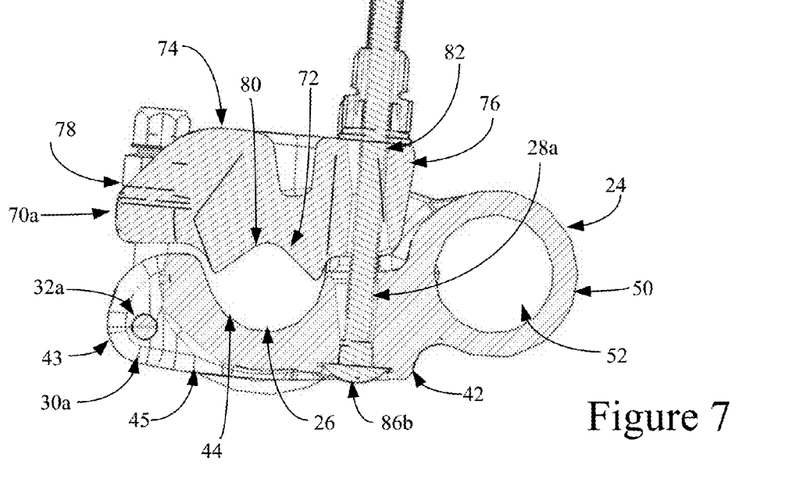
FIG. 7 of the drawings is a cross-sectional view of the first end section taken, generally about lines 7-7 of FIG. 2.
Figure 10:
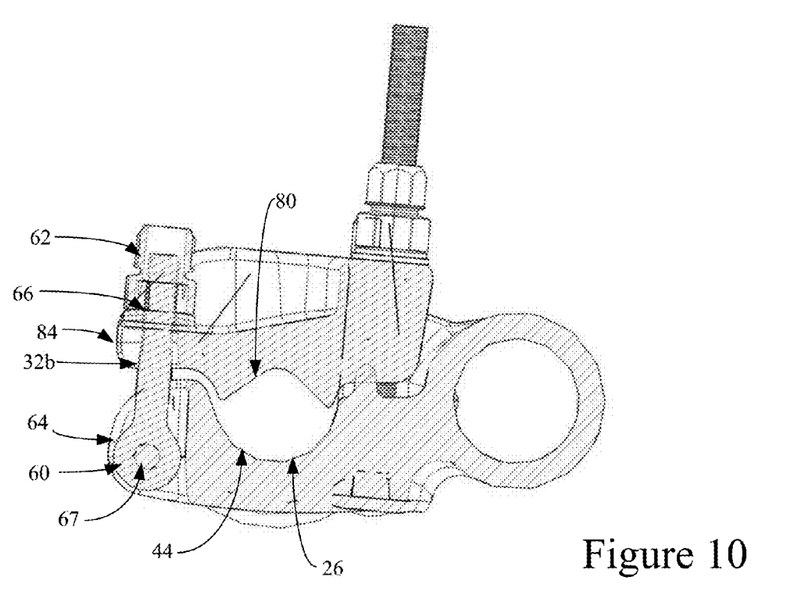
FIG. 10 of the drawings is a cross-sectional view of the first end section taken generally about lines 10-10 of FIG. 2.

With additional reference to FIG. 7, in addition to FIGS. 1 and 3-5, a link member receiver 24 is positioned along the inboard side 42 proximate the inner end 40. The link member receiver comprises a cylindrical member having a transverse bore extending from the inner end toward the outer end. In the embodiment shown, the cylindrical member is integrally molded with the body 22 so that the transverse bore is of a predetermined size. In other embodiments, the transverse bore may be formed by a plurality of members which are coupled together with a clamp or the like, wherein, the configuration and size of the transverse bore can be adjusted.

A conductor receiving groove 36 extends from the inner end 40 to the outer end 41 and is positioned between the inboard side 42 and the outboard side 43. In the embodiment shown, the conductor receiving groove has a substantially hemispherical cross-sectional configuration with surface variations that promote the clamping of the conductor received therein. Of course, other configurations are likewise contemplated. The conductor receiving groove, in the embodiment shown, is generally parallel to the transverse bore 52 of the link member receiver 24. In the embodiment shown, the conductor receiving groove 26 extends from the inner end 40 to the outer end 41 and is of a generally uniform cross-sectional configuration.

Figure 3:
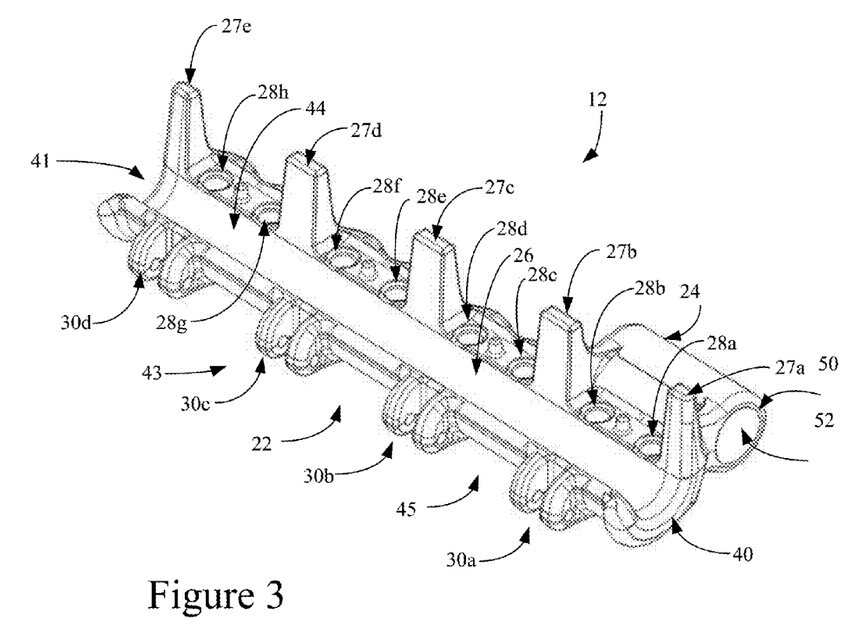
FIG. 3 of the drawings is a perspective view of an embodiment of the body of the first end section of the electrical transmission line repair apparatus of the present disclosure.
Figure 4:
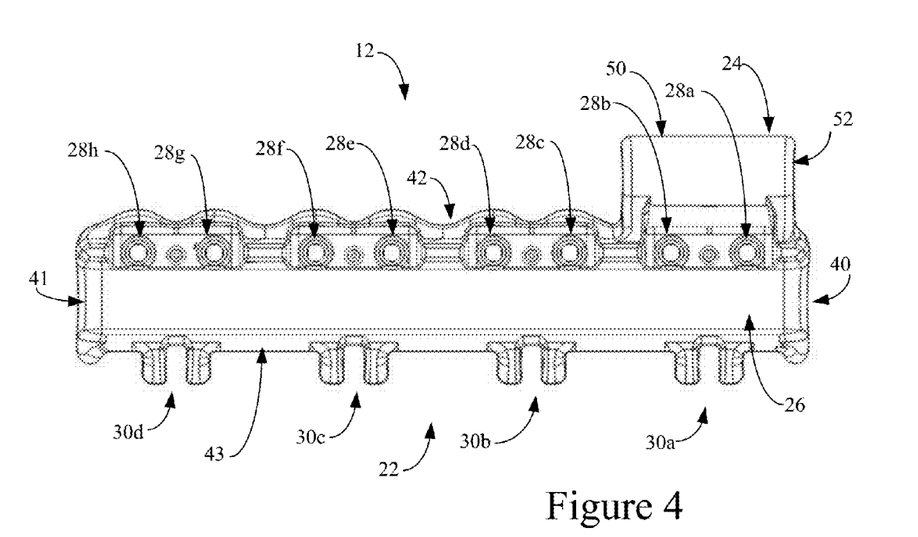
FIG. 4 of the drawings is a top plan view of the body of the first end section of the electrical transmission line repair apparatus of the present disclosure.

With particular reference to FIGS. 3 and 4, a plurality of openings 28a-28h, transverse to the conductor receiving groove are positioned therealong, between the groove and the inboard side 42. As will be explained, these openings are configured to receive coupling bolts that join the clamping members 70a-70d to the body 22. As each of the clamping members in the embodiment shown is coupled to the body through a pair of coupling bolts, a separator member 27a-27e may be positioned on the body 22 between each pair of openings. Such a separator member facilitates the locating, positioning and assembling of the clamping members 70a-70d.

Figures 5, 6, 8, 9:
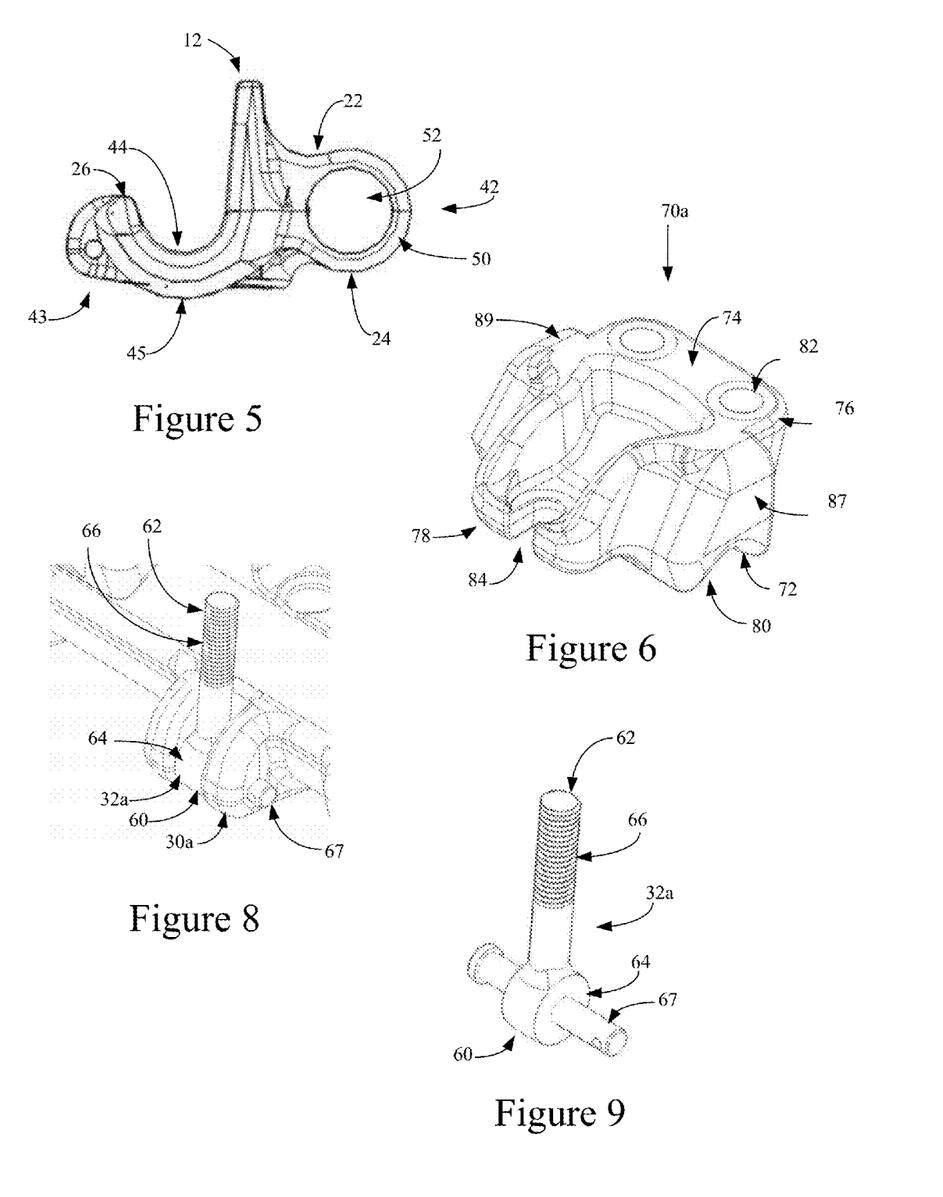
FIG. 5 of the drawings is a right side elevational view of the body of the first end section of the electrical transmission line repair apparatus of the present disclosure.
FIG. 6 of the drawings is a perspective view of an exemplary clamping member of the electrical transmission line repair apparatus of the present disclosure.
FIG. 8 of the drawings is a partial perspective view of the body of the first section, showing, in particular, a pivot bolt coupled thereto.
FIG. 9 of the drawings is a perspective view of the pivot bolt of the present disclosure.

Positioned on the outboard side 43 of the body 22 in a spaced apart orientation are axle flange pairs 30a-30d. The axle flange pairs are generally positioned between pair of openings 28a-28h on the opposite side of the conductor receiving groove 26 from the openings. With further reference to FIG. 8, each axle flange pair includes a pair of spaced apart flanges with corresponding openings defining an axle support that is generally parallel to, and offset from, the conductor receiving groove 26.

Pivot bolts 32a-32d are shown in FIG. 1. With further reference to FIG. 9, pivot bolt 32a will be described in detail with the understanding that the remaining pivot bolts are substantially identical thereto. Pivot bolt 32a includes first end 60 and second end 62. First end 60 includes head 64 which includes opening 67 extending therethrough. A threadform extends from the second end toward the first end a predetermined distance.

With reference to FIG. 8, the pivot bolt 32a is coupled to the axle flange pair 30a. In particular, the head 64 of the pivot bolt 32a is positioned between the pair of flanges 30a so that the opening 67 lines up with the opening 32a. Axle 68 is then directed through the openings 32a of the pair of flanges and also through the opening 67.

The clamping members are shown at 70a-70d of FIG. 1. In the embodiment shown, each of the four clamping members are substantially identical, and, as such, clamping member 70a will be described with the understanding that the remaining clamping members are substantially identical.

With reference to FIG. 6, clamping member 70a includes inner surface 72, outer surface 74, inner side 76, outer side 78, first end 87 and second end 89. A conductor receiving groove 80 extends from the first end 87 to the second end 89 between the inner side 76 and the outer side 78. The transverse openings 82a, 82b extend from the outer surface 74 to the inner surface 72, substantially perpendicularly to the conductor receiving groove 80 and correspond to the openings 28a, 28b. The openings 82a, 82b are positioned between the conductor receiving groove 80 and the inner side 76. On the opposite side of the conductor receiving groove, slotted opening 84 is positioned.

With additional reference to FIGS. 1 and 3, coupling bolts 86a-86h extend through an opening on each one of the first end section and the clamping member. For example, bolt 86a extends through opening 28a of the first end section 12 and also transverse opening 82a. The bolt is capped with nut 93a, and a suitable washer may be positioned therebetween as well. The bolt may comprise a carriage type bolt that interfaces with the opening of the first end section so as to be precluded from rotation while the nut is affixed.

Figure 19:
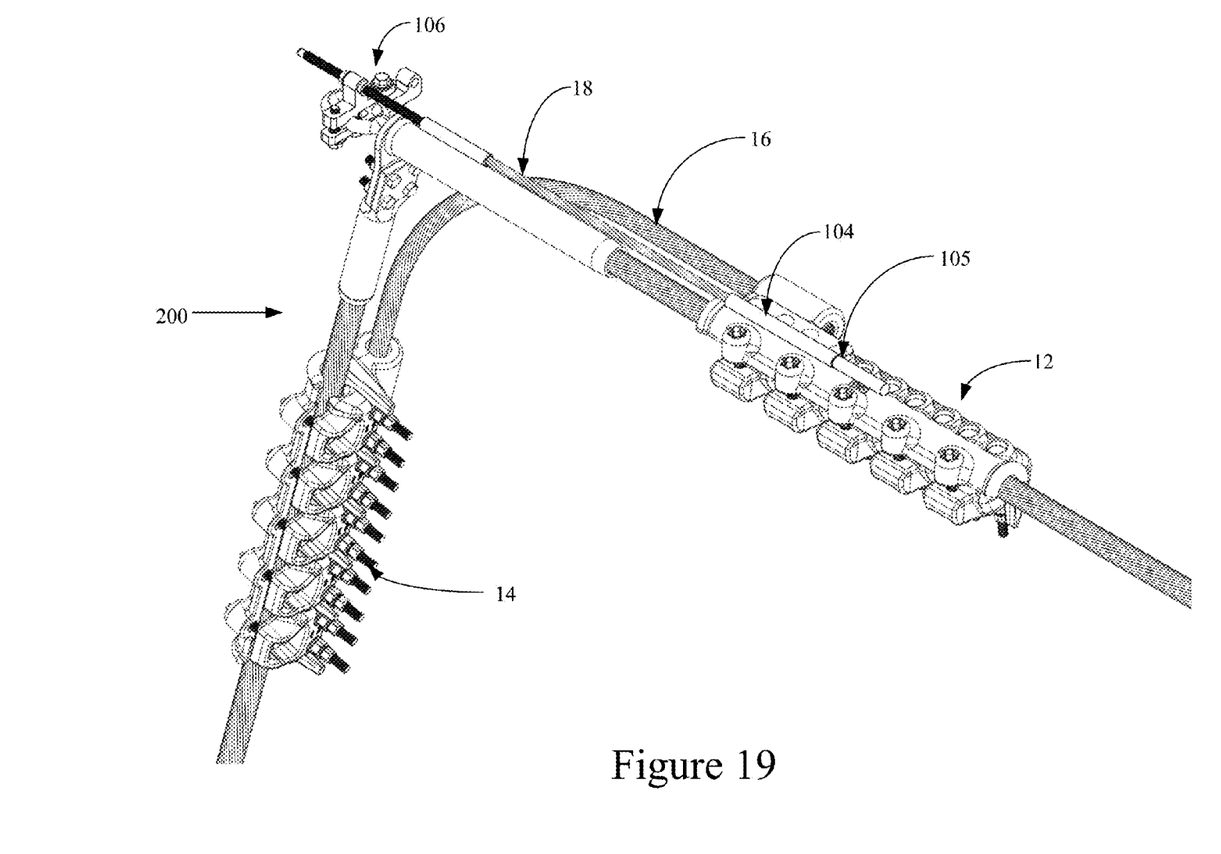
FIG. 19 of the drawings is a perspective view of the apparatus in the embodiment of FIG. 20 in an installed environment around a dead end, with a flexible safety tether being installed thereacross to an eyelet of the dead end.
Figure 20:
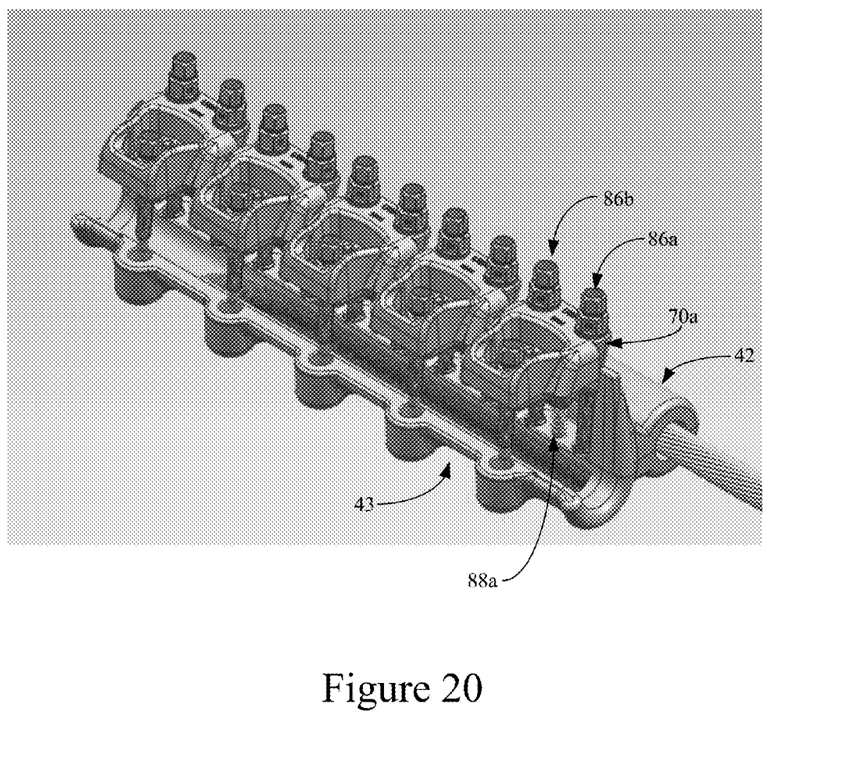
FIG. 20 of the drawings is a perspective view of another embodiment of a first end section of the present disclosure.

In some embodiments, such as the embodiment of FIGS. 19 and 20, a plurality of clamping springs, such as clamping spring 88a may be positioned between bolts 86a, 86b so as to outwardly bias the clamping member 70a relative to the inboard side 42 of the first end section 12. As will be explained, such a spring aids the proper positioning of the transmission line within the apparatus. In such an embodiment, the pivot bolts can be omitted and a set of bolts may proceed directly through the clamping members and into the body. The clamping members may accept a bolt and the body may include a nut to capture the bolt extended therethrough. It will be understood that the bolts are introduced beyond the clamping members after the installation of the electrical transmission line.

The second end section 14 is shown in FIGS. 2 and 11 through 13 and is a substantial mirror image of the first end section 12. Thus, similar as comprising body 122, pivot bolts 132a-132d, clamping members 170a-170d and coupling bolts 186a-186h. The body 122 is defined by inner end 140, outer end 141, inboard side 142, outboard side 143, inner side 144 and outer side 145. It will be understood that the body 122 generally comprises a cast or forged metal member (preferably a steel, aluminum alloy or other conductive material).

Figure 11:
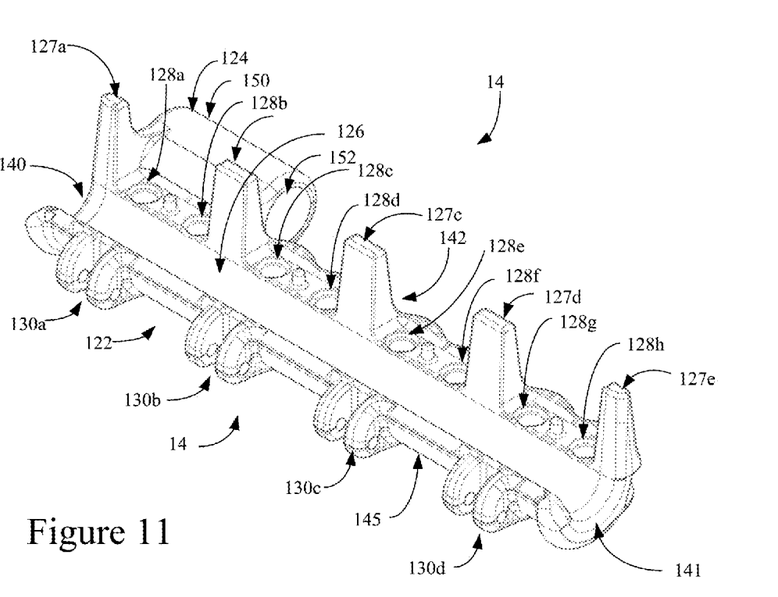
FIG. 11 of the drawings is a perspective view of an embodiment of the body of the second end section of the electrical transmission line repair apparatus of the present disclosure.
Figure 12:
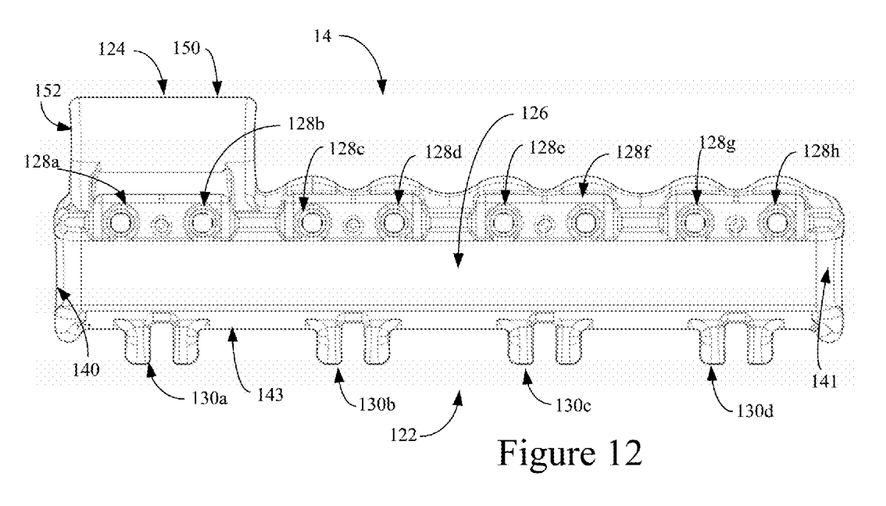
FIG. 12 of the drawings is a top plan view of the body of the second end section of the electrical transmission line repair apparatus of the present disclosure.
Figures 13, 14, 16, 17:
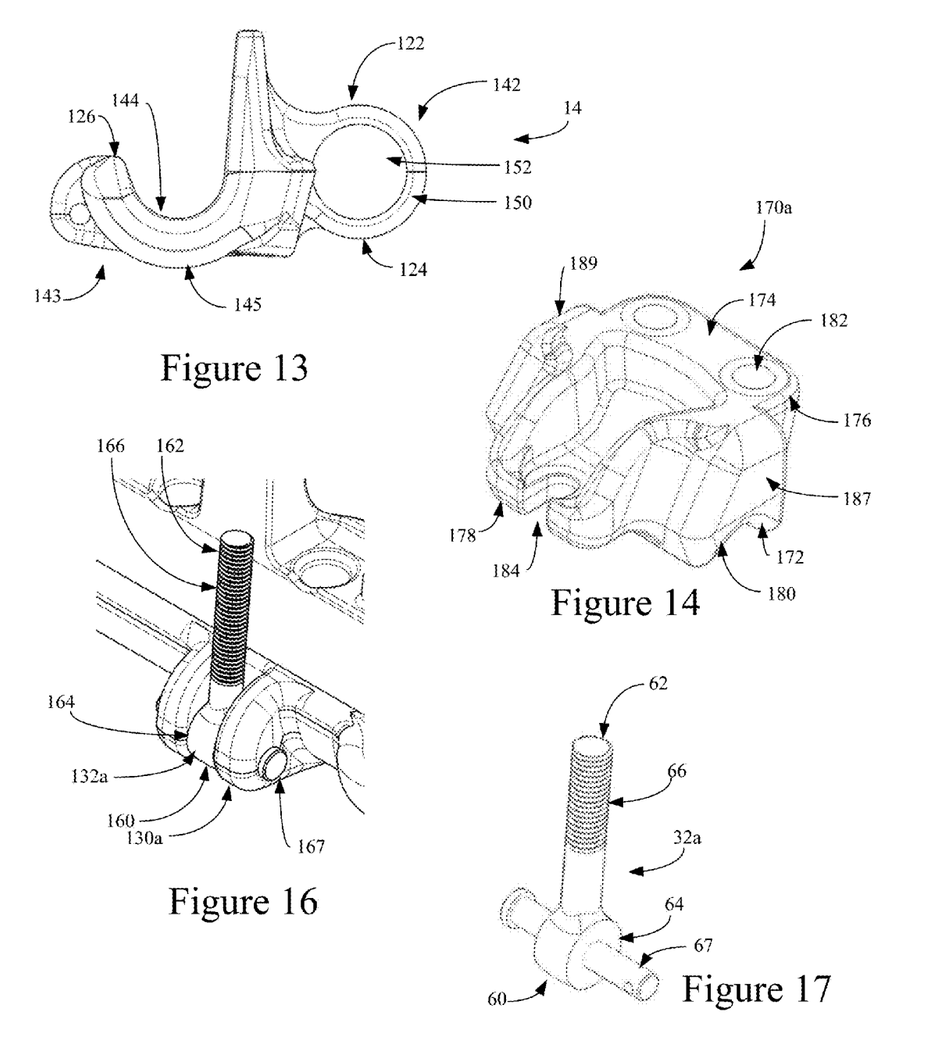
FIG. 13 of the drawings is a right side elevational view of the body of the second end section of the electrical transmission line repair apparatus of the present disclosure.
FIG. 14 of the drawings is a perspective view of an exemplary clamping member of the electrical transmission line repair apparatus of the present disclosure.
FIG. 16 of the drawings is a partial perspective view of the body of the second section, showing, in particular, a pivot bolt coupled thereto.
FIG. 17 of the drawings is a perspective view of the pivot bolt of the present disclosure.
Figure 15:
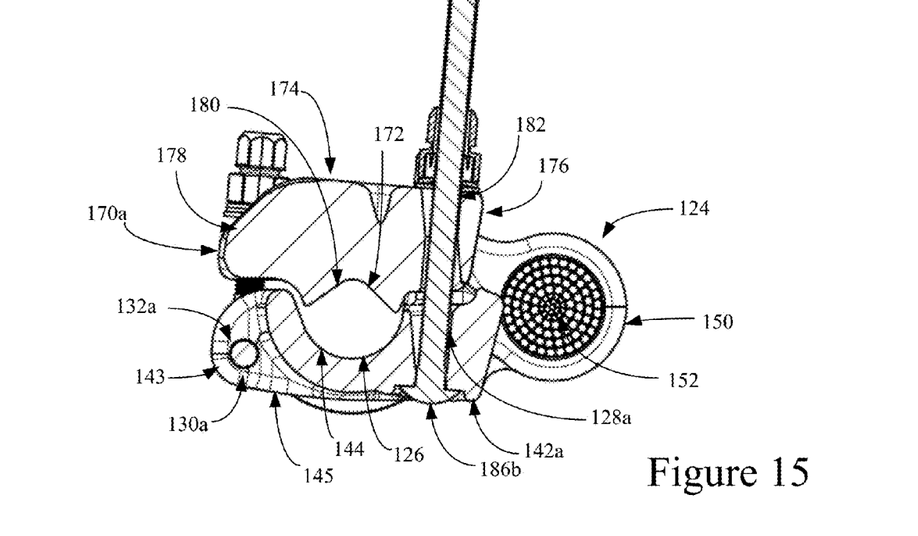
FIG. 15 of the drawings is a cross-sectional view of the second end section taken, generally about lines 15-15 of FIG. 2.
Figure 18:
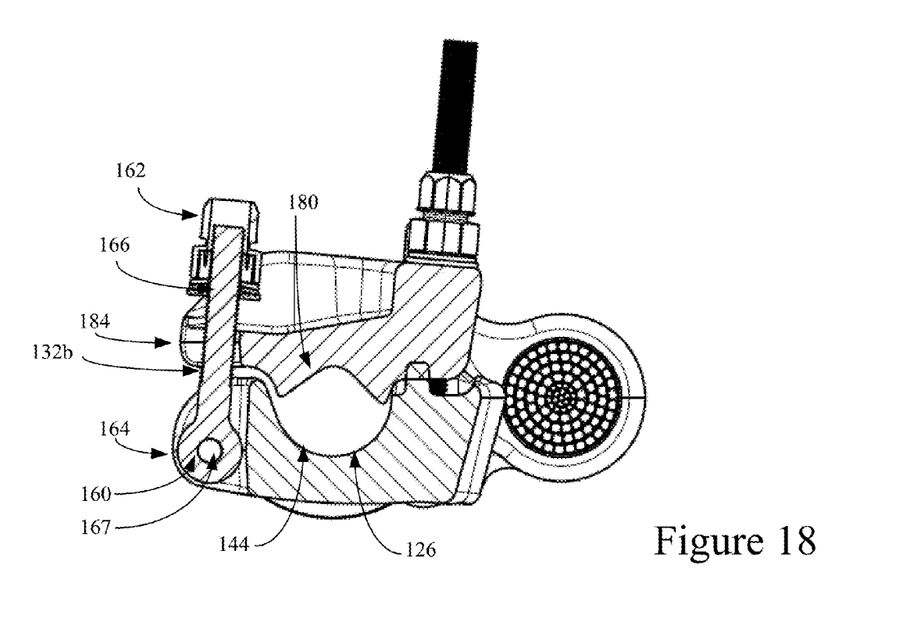
FIG. 18 of the drawings is a cross-sectional view of the second end section taken generally about lines 18-18 of FIG. 2.

With additional reference to FIG. 15, in addition to FIGS. 11 through 13, a link member receiver 124 is positioned along the outboard side 143 proximate the inner end 140. The link member receiver comprises a cylindrical member having a transverse bore extending from the inner end toward the outer end. In the embodiment shown, the cylindrical member is integrally molded with the body 122 so that the transverse bore is of a predetermined size. In other embodiments, the transverse bore may be formed by a plurality of members which are coupled together with a clamp or the like, wherein, the configuration and size of the transverse bore can be adjusted.

A conductor receiving groove 136 extends from the inner end 140 to the outer end 141 and is positioned between the inboard side 142 and the outboard side 143. In the embodiment shown, the conductor receiving groove has a substantially hemispherical cross-sectional configuration with surface variations that promote the clamping of the conductor received therein. Of course, other configurations are likewise contemplated. The conductor receiving groove, in the embodiment shown, is generally parallel to the transverse bore 152 of the link member receiver 124. In the embodiment shown, the conductor receiving groove 126 extends from the inner end 140 to the outer end 141 and is of a generally uniform cross-sectional configuration.

With particular reference to FIGS. 11 and 12, a plurality of openings 128a-128h, transverse to the conductor receiving groove are positioned therealong, between the groove and the inboard side 142. As will be explained, these openings are configured to receive coupling bolts that join the clamping members 170a-170d to the body 122. As each of the clamping members in the embodiment shown is coupled to the body through a pair of coupling bolts, a separator member 127a-127e may be positioned on the body 122 between each pair of openings. Such a separator member facilitates the locating, positioning and assembling of the clamping members 170a-170d.

Positioned on the outboard side 143 of the body 122 in a spaced apart orientation are axle flange pairs 130a-130d. The axle flange pairs are generally positioned between pair of openings 128a-128h on the opposite side of the conductor receiving groove 126 from the openings. Each axle flange pair includes a pair of spaced apart flanges with corresponding openings defining an axle support that is generally parallel to, and offset from, the conductor receiving groove 26.

Pivot bolts 132a-132d are shown in FIG. 2. With further reference to FIG. 17, a pivot bolt 132a will be described in detail with the understanding that the remaining pivot bolts are substantially identical thereto. Pivot bolt 132a includes first end 160 and second end 162. First end 160 includes head 164 which includes opening 167 extending therethrough. A threadform extends from the second end toward the first end a predetermined distance.

With reference to FIG. 16, the pivot bolt 132a is coupled to the axle flange pair 130a. In particular, the head 164 of the pivot bolt 132a is positioned between the pair of flanges 130a so that the opening 167 lines up with the opening 132a. Axle 168 is then directed through the opening 132a of the pair of flanges and also through the opening 167.

The clamping members are shown at 170a-170d are shown in FIG. 2. In the embodiment shown, each of the four clamping members are substantially identical, and, as such, clamping member 170a will be described with the understanding that the remaining clamping members are substantially identical.

With reference to FIG. 14, clamping member 170a includes inner surface 172, outer surface 174, inner side 176, outer side 178, first end 187 and second end 189. A conductor receiving groove 180 extends from the first end 187 to the second end 189 between the inner side 176 and the outer side 178. The transverse openings 182a, 182b extend from the outer surface 174 to the inner surface 172, substantially perpendicularly to the conductor receiving groove 180 and correspond to the openings 128a, 128b. The openings 182a, 182b are positioned between the conductor receiving groove 180 and the inner side 176. On the opposite side of the conductor receiving groove, slotted opening 184 is positioned.

With additional reference to FIGS. 1 and 3, coupling bolts 186a-186h extend through an opening on each one of the first end section and the clamping member. For example, bolt 86a extends through opening 128a of the second end section 14 and also transverse opening 182a. The bolt is capped with nut 193a, and a suitable washer may be positioned therebetween as well. The bolt may comprise a carriage type bolt that interfaces with the opening of the first end section so as to be precluded from rotation while the nut is affixed.

Link member 16 is shown in FIGS. 1 and 2 as extending between the first end section 12 and the second end section 14. In the embodiment shown, the link member 16 comprises a multiple strand cable, which may be formed from a metal, such as steel, aluminum alloy or a combination. It is also contemplated that other constructions are likewise contemplated, such as, for example, a link member that is formed from a composite material (such as a fiber and resin composite rod-like member) that is combined with an outer cladding of a metal member. The link member includes first end 90 which interfaces with the link member receiver 24 of the first end section 12, and a second end 92 which interfaces with the link member receiver 124 of the second end section 14. More particularly, the first end 90 extends into the transverse bore 52 of the link member receiver and is crimped therein so as to be precluded from being disconnected. Similarly, the second end 92 extends into the transverse bore 152 of the link member receiver and is crimped therein so as to be precluded from being disconnected. While a single link member is shown, multiple link members may be utilized, however such multiple link members remain on one side of the conductor receiving groove of the base, with the other side of the conductor receiving groove being free of any link member. Any link member is positioned at or between the conductor groove and the inboard side with the embodiment shown being positioned on the inboard side itself (that is defining the inboard side of the device). That is the link member (and any one thereof) is not coupled to the first and second end sections between the conductor groove and the outboard side of the respective end section. It will further be understood that the link member comprises a conductor which is generally sized to correspond to the conductor, inasmuch as the link member may comprise the electrical communication between the first and second end sections, in the event of a failure in the transmission line that the apparatus is straddling. While other connections may be present, that is, tethers, and the like, the configuration envisions a single link member (i.e., conductor that generally mimics the transmission line), or multiple link members all positioned on the inboard side of the respective end section.

To install the electrical transmission line repair apparatus 10 around a dead end (FIG. 19), for example, a unit is first prepared. It will be understood that the advantage with such a system is that the system can be positioned and affixed so that all of the nuts that are to be tightened, can be tightened from below, along with the installation. The installation around a dead end is shown in FIG. 19 utilizing the embodiment shown in FIG. 20. It will be understood that the description below will describe the installation of the embodiment of FIGS. 1 through 18 with the understanding that the difference between the installations is the coupling of the coupling bolts after insertion of the transmission line. In the embodiment of FIG. 19, the springs maintain the clamping members spaced apart from the body. The springs are overcome by the fastening of the coupling bolts. The fastening bolt on the opposite side from bolts 86*a*, 86*b* is then inserted through the clamping member and into the body.

With the embodiment of FIGS. 1 through 18, the initial preparation of the apparatus 10 comprises the preparation of the first end section 12. The first end section 12 is prepared by separating the clamping members 70*a*-70*d* from the body 22 of the first end section 12. To achieve the same, the nuts are manipulated so as to loosen the same. At the same time, the pivot bolts 32*a*-*d* are also loosened, and the pivot bolts themselves are rotated away from the respective slotted openings 84*a*-84*d*. As the different bolts are loosened, the springs 88*a*-88*d* direct the separation of the clamping members from the first end section, thereby increasing the separation of the conductor receiving grooves 80*a* of the clamping members 70 from the conductor receiving groove 26 of the first end section 12.

The same is done to the second end section 14. In particular, the screws are loosened so that the clamping members 170*a*-170*d* of the body 122 are separated from the clamping members 170*a*-170*d*. Additionally, the pivot bolts 132*a*-132*d* are loosened and also swung away from a position within the slotted openings 184*a*-184*d*. Once these bolts are all loosened, the springs 188*a*-188*d* force the components to separate. In turn, the conductor receiving groove 180*a*-180*d* is separated from the conductor receiving groove 126 of the second end section 14.

Next, the apparatus 10 is positioned proximate the dead end so that the first end section 12 is proximate the transmission line on one side of the dead end, and the second end section 14 is proximate the transmission line on the other side of the dead end. Preferably, from underneath the transmission line, the transmission line is extended between the body 22 and the clamping members 70*a*-70*d* of the first end section. While loose, the transmission line interfaces with the conductor receiving grooves so as to loosely remain in position. Similarly, and on the other side of the dead end, the transmission line is extended between the body 122 and the clamping members 170*a*-170*d* of the second end section.

Once positioned, the coupling bolts 88*a*-88*h* are sequentially tightened, clamping the transmission line between the conductor receiving groove 80*a*-80*d* of each of the clamping members 70*a*-70*d* and the conductor receiving groove 26 of the body 22. Eventually, contact is maintained along substantially the entire length of the first end section, and the transmission line is clamped therebetween. During the tightening process, the pivot bolts 32*a*-32*d* are rotated about their respective axles 68 so as to be directed into the respective slotted opening 84*a*-84*d*. Once inserted into the slotted openings, the nuts associated with the pivot bolts can be tightened to further apply clamping force, to, in turn, enhance the grip on the transmission line positioned therebetween.

As explained above, it will be understood that in certain embodiments, rather than having a pivot bolt, an opening can be provided on each of the clamping members and the first end section, with a bolt being extended through each. Such a configuration is shown in FIG. 20. The spring 88*a* precludes the movement of the clamping member to allow for the insertion of the transmission line. The bolt opposite the bolts 86*a*, 86*b* can be maintained within the clamping member through washers and the like (i.e., to keep from backing out), or may be inserted after the transmission line is inserted. The body includes a captive nut that is precluded from rotation during the tightening of the bolt.

Similarly, once the second end section 14 is positioned, the coupling bolts 188*a*-188*h* are sequentially tightened, clamping the transmission line between the conductor receiving groove 180*a*-180*d* of each of the clamping members 170*a*-170*d* and the conductor receiving groove 126 of the body 122. Eventually, contact is maintained along substantially the entire length of the second end section, and the transmission line is clamped therebetween. During the tightening process, the pivot bolts 132*a*-132*d* are rotated about their respective axles 168 so as to be directed into the respective slotted openings 184*a*-184*d*. Once inserted into the slotted openings, the nuts associated with the pivot bolts can be tightened to further apply clamping force, to, in turn, enhance the grip on the transmission line positioned therebetween. It will be understood that, as is explained with respect to the first end section, in certain embodiments, rather than having a pivot bolt, an opening can be provided on each of the clamping members at the second end section, with a bolt being extended through each.

Once fully tightened, the electrical transmission line repair apparatus 10 has a first end section 12 on one side of the dead end, and a second end section 14 on the other side of the dead end. The link member 16 extends therebetween, and provides a bypass around the dead end, restoring both mechanical and electrical integrity to the conductor in the localized area between the first and second end sections 12, 14. It will be understood that damage to strands can occur at splices, suspensions and dead ends, due to Aeolian vibration which causes fatigue. Additionally, the installation is greatly eased and can be done completely from below the dead end, splice or suspension. This greatly facilitates the attachment and installation by a user. In particular, not only does the initial attachment occur below the transmission line, but the tightening of the nuts on the bolts also occurs from below, which provides an enhanced ease of assembly.

A flexible safety tether 18 assembly can then be provided. One example of a flexible safety tether 18 is shown in FIG. 19 as including first end 104 and second end 106. The first end 104 is coupled to the first end section with the second end 106 being coupled to the dead end coupling by way of a clamp. Although it will be understood that the second end may be substantially identical to the first end and may be coupled to the second end section 14 (while being looped through a dead end, or another structure that is coupled to a pole or other outside object).

Figure 21:
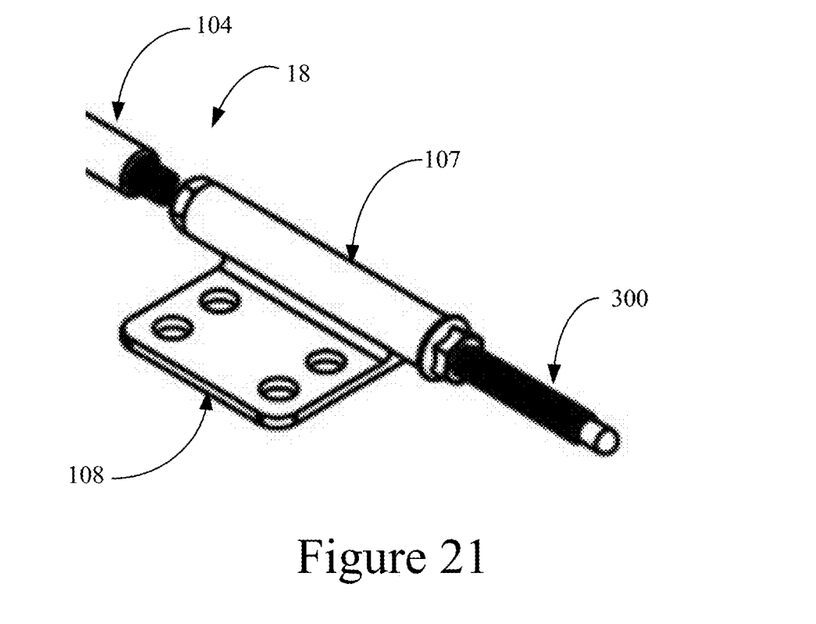
FIG. 21 of the drawings is a perspective view of a first end of a tether, showing, in particular, the configuration of the bolt and nut of the present disclosure.

The coupling of the safety tether and the first end section 12 is shown in FIG. 21 as including a bracket 105 that is coupled to the first end section. The bracket 105 includes an elongated opening 107 which is configured to grasp the first end of the safety tether cable 18 (which generally terminates with a bolt having a threadform thereon). The bolt extends through the elongated opening and a nut is threadingly engaged to the bolt to maintain the position of the bolt within the elongated opening. A similar configuration may be applied to the second end 106 of the tether which is coupled to the second end section 14. The flexible safety tether can be looped through a portion of the dead end so that in the event of the failure of the dead end, the safety tether will maintain the transmission cable in the proper orientation.

In the embodiment of FIG. 19, the second end 106 may be coupled to a bracket which likewise includes an elongated opening through which the cable is coupled. In such a configuration, the cable is coupled by way of fasteners to the end eyelet of the dead end structure. In such a configuration, in the event of a failure, the tether will maintain the transmission line proximate the dead end until a repair can be effectuated.

One difficulty in applying a nut to a bolt in such an environment is due to the sheer difficulty in controlling a nut from a distance. For example, to apply a nut to the bolt of a tether, the nut is placed within a socket which is at the end of an eleven foot long insulative stick. To further complicate matters, the user is typically in the bucket of a bucket truck and generally dozens of feet in the air.

Figure 22:
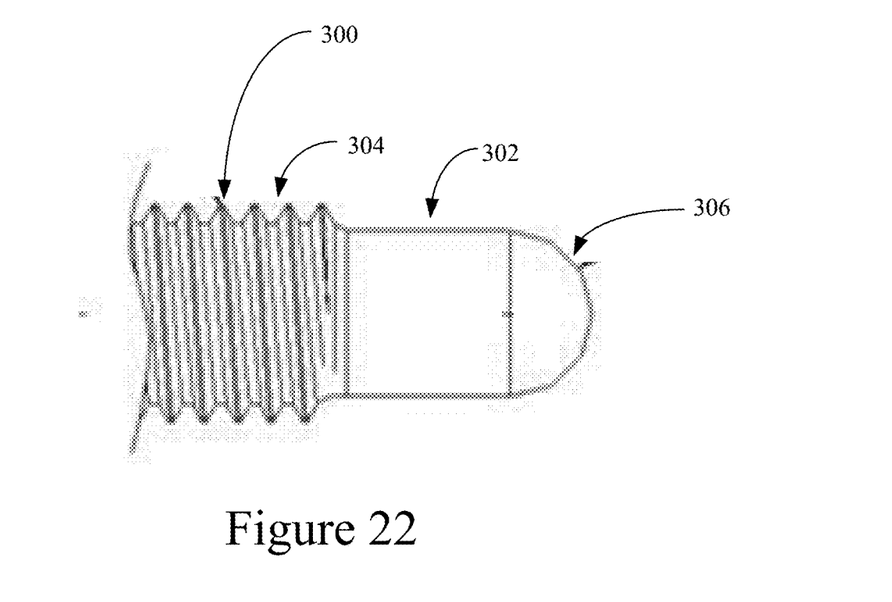
FIG. 22 of the drawings is a partial side elevational view of the bolt for use with the present disclosure, showing the distal end of the bolt.

As a result, it has been found that the application of a nut to a bolt in such a configuration is greatly enhanced through the use of a bolt 300 of the type shown in FIGS. 21 and 22. Such a bolt 300 includes body 302 having threads 304 and a distal end 306. The body of the bolt is such that at the distal end 306, the bolt is free of threads and a diameter that is smaller than the threads. Additionally, the distal end 306 of the bolt is radiused, that is, it has a domed configuration. In other embodiments, another outwardly convex configuration is contemplated. As a result, a nut can easily be located over the distal end even when controlled in the manner described above. Once located over the distal end of the bolt, further movement of the nut along the distal end of the bolt serves to align the nut relative to the bolt. Thus, once the nut approaches the threads, the nut is already generally aligned and mating threaded engagement can more easily be achieved. Such a configuration can be utilized with any of the nuts and bolts that are utilized on the apparatus as shown, and especially where the mating engagement of the nut and the bolt is achieved from a distance.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. An electrical transmission line repair apparatus comprising:
    a first end section including:
        a body with a conductor receiving groove positioned on an inner side of the body extending transversely thereacross from an inner end to an outer end, the conductor receiving groove defining an inboard side to a first side of the conductor receiving groove, and an outboard side to a second side of the conductor receiving groove;
        at least one clamping member which includes an inner surface and an outer surface, as well as, an inner side and an outer side, a conductor receiving groove extending between a first end and a second end thereof, between the inner side and the outer side;
        the body and the at least one clamping member being releasably attachable to each other through a plurality of fasteners, such that the inner surface of the at least one clamping member faces the inner side of the body, with the conductor receiving groove of the body substantially matching with the conductor receiving groove of the at least one clamping member, so as to be configured to clamp a conductor therebetween, at least one of the plurality of fasteners being positioned between the inboard side and the conductor receiving groove, with the other of the plurality of fasteners being positioned between the outboard side and the conductor receiving groove;
    a second end section spaced apart from the first end section, the second end section further including:
        a body with a conductor receiving groove positioned on an inner side of the body extending transversely thereacross from an inner end to an outer end, the conductor receiving groove defining an inboard side to a first side of the conductor receiving groove, and an outboard side to a second side of the conductor receiving groove;
        at least one clamping member which includes an inner surface and an outer surface, as well as, an inner side and an outer side, a conductor receiving groove extending between a first end and a second end thereof, between the inner side and the outer side;
        the body and the at least one clamping member being releasably attachable to each other through a plurality of fasteners, such that the inner surface of the at least one clamping member faces the inner side of the body, with the conductor receiving groove of the body substantially matching with the conductor receiving groove of the at least one clamping member, so as to be configured to clamp a conductor therebetween, at least one of the plurality of fasteners being positioned between the inboard side and the conductor receiving groove, with the other of the plurality of fasteners being positioned between the outboard side and the conductor receiving groove;
    at least one link member joining the first end section to the second end section, each of the at least one link member coupled to the first end section on the inboard side of the body of the first end section and each of the at least one link member coupled to the second end section on the inboard side of the body of the second end section, and wherein the outboard side of the body of the first end section is not coupled to the outboard side of the body of the second end section.

2. The apparatus of claim 1 wherein the body of the first end section and the body of the second end section are substantial mirror images of each other.

3. The apparatus of claim 1 wherein the at least one link member comprises a single link member that extends between the first end section and the second end section, the at least one link member being oriented substantially parallel to the conductor receiving groove of each of the first end section and the second end section at the respective one of the first end section and the second end section.

4. The apparatus of claim 3 wherein the single link member is coupled to the first end section at the inner end thereof, and the single link member is coupled to the second end section at the inner end thereof.

5. The apparatus of claim 1 wherein the at least one fastener positioned between the conductor receiving groove and the inboard side of each of the first end section and the second end section comprises at least two spaced apart bolts extending through the at least one clamping members to, in turn, preclude rotation of the at least one clamping members about an axis defined by the at least two spaced apart bolts.

6. The apparatus of claim 5 wherein the at least one fastener positioned between the conductor receiving groove and the outboard side of each of the first end section and the second end section comprises a bolt configured to extend through an opening on the clamping member, and engageable with a corresponding threaded member on the body between the conductor receiving groove and the outboard side.

7. The apparatus of claim 6 further comprising at least one biasing member extending between the at least one clamping member and the respective one of the first and second end section with which the at least one clamping member is associated, the at least one biasing member configured to bias the clamping member away from the body.

8. The apparatus of claim 5 wherein the at least one fastener positioned between the conductor receiving groove and the outboard side of each of the first end section and the second end section comprises at least one pivot bolt that extends on the outboard side of the conductor receiving groove, the pivot bolt having a first end with an axle extending therethrough, the axle being rotatably coupled to the body at the outboard side thereof, the pivot bolt being rotatable relative to the body about the axle so as to be insertable into a slotted opening on the clamping member at the outer side thereof, so as to releasably couple the same.

9. The apparatus of claim 1 wherein:
the at least one clamping member of the first end section comprises a plurality of clamping members that are positioned sequentially between the inner end and the outer end of the body of the first end section; and
the at least one clamping member of the second end section comprise a plurality of clamping members that are positioned sequentially between the inner end and the outer end of the body of the second end section.

10. The apparatus of claim 1 wherein each of the plurality of fasteners associated with the at least one clamping members of each of the first end section and second end section are oriented so as to be accessed from the inside surface of each of the first end section and the second end section.

11. The apparatus of claim 1 wherein each of the plurality of fasteners extend generally perpendicular to the conductor receiving groove of the respective one of the first and second end sections with which they are associated.

12. The apparatus of claim 1 wherein the first end section further includes a link member receiver positioned along the inboard side thereof, the link member receiver comprising a transverse bore that is substantially parallel to the conductor receiving groove of the first end section, and the second end section further includes a link member receiver positioned along the inboard side thereof, the link member receiver comprising a transverse bore that is substantially parallel to the conductor receiving groove of the first end section.

13. The apparatus of claim 1 further comprising:
a tether assembly including:
a tether cable having a first end and a second end, and
a bracket positioned at a first end and coupled to the body of the first end section,
the bracket further includes an elongated opening configured to receive the first end of the tether cable therethrough, with the first end of the tether cable having a threadform therealong and defining a distal end, and a nut configured to engage the threadform, to, in turn, preclude removal of the tether cable from the bracket.

* * * * *